United States Patent
Yoshizaki et al.

(10) Patent No.: US 9,657,677 B2
(45) Date of Patent: May 23, 2017

(54) INTEGRATED VEHICLE CONTROL APPARATUS AND INTEGRATED CONTROL METHOD

(71) Applicant: TOYOTA JIDOSHA KABUSHIKI KAISHA, Toyota-shi, Aichi-ken (JP)

(72) Inventors: Satoshi Yoshizaki, Gotenba (JP); Naoto Kato, Gotenba (JP); Shigehiro Sugihira, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/136,059

(22) Filed: Apr. 22, 2016

(65) Prior Publication Data

US 2016/0312734 A1  Oct. 27, 2016

(30) Foreign Application Priority Data

Apr. 24, 2015 (JP) ................ 2015-089475

(51) Int. Cl.
*B60W 30/19* (2012.01)
*F02D 41/24* (2006.01)
*F02D 41/02* (2006.01)
*F02D 41/14* (2006.01)
*F02D 41/00* (2006.01)
*F16H 63/50* (2006.01)

(52) U.S. Cl.
CPC ......... *F02D 41/2461* (2013.01); *B60W 30/19* (2013.01); *F02D 41/0002* (2013.01); *F02D 41/023* (2013.01); *F02D 41/1497* (2013.01); *F16H 63/50* (2013.01); *F02D 2250/18* (2013.01); *F02D 2250/21* (2013.01)

(58) Field of Classification Search
CPC ..................................... B60W 30/19
See application file for complete search history.

(56) References Cited

U.S. PATENT DOCUMENTS

2004/0106498 A1  6/2004  Badillo et al.
2013/0045832 A1  2/2013  Whitney et al.

FOREIGN PATENT DOCUMENTS

| DE | 102006005446 A1 | 8/2007 |
| EP | 0887533 A2 | 12/1998 |
| JP | 2007-263127 A | 10/2007 |
| JP | 2009-097445 A | 5/2009 |

*Primary Examiner* — Derek D Knight
(74) *Attorney, Agent, or Firm* — Andrews Kurth Kenyon LLP

(57) ABSTRACT

An integrated control apparatus includes an internal combustion engine, a stepped automatic transmission, a power train manager, and an engine controller. The power train manager is configured to: output a target torque and a forenotice torque to the engine controller; start lowering of the target torque after a specified time elapses from a timing of an upshifting instruction; lower the forenotice torque prior to the lowering of the target torque. The engine controller is configured to: start a reduction in an air amount in accordance with a magnitude of lowering of the forenotice torque; start reducing the air amount from a time when the lowering of the forenotice torque is started until a time when the lowering of the target torque is started; and adjust an air-fuel ratio in accordance with a deviation between the target torque and a torque that is estimated from a lean air-fuel ratio and the air amount.

6 Claims, 10 Drawing Sheets

INTEGRATED VEHICLE CONTROL APPARATUS AND INTEGRATED CONTROL METHOD

INCORPORATION BY REFERENCE

The disclosure of Japanese Patent Application No. 2015-089475 filed on Apr. 24, 2015 including the specification, drawings and abstract is incorporated herein by reference in its entirety.

BACKGROUND

1. Field of the Invention

The invention relates to an integrated control apparatus and an integrated control method for a vehicle having a power train that includes a combination of an internal combustion engine operated at a lean air-fuel ratio that is leaner than a theoretical air-fuel ratio and a stepped automatic transmission.

2. Description of Related Art

Various methods for suppressing generation of a shock that is associated with a gear shift operation of a stepped automatic transmission by cooperative control of the stepped automatic transmission and an internal combustion engine have been suggested. For example, in Japanese Patent Application Publication No. 2009-097445 (JP 2009-097445 A), a method for suppressing the generation of the shock that is associated with the gear shift operation at a time that the stepped automatic transmission is upshifted is disclosed. In the technique of JP 2009-097445 A, torque of the internal combustion engine is temporarily lowered by reducing an intake air amount. In this way, an engine speed is decreased, and the generation of the shock that is associated with the gear shift operation is suppressed. In addition, a method for temporarily lowering the torque by delaying ignition timing is also known.

During upshifting of the stepped automatic transmission, it is preferred to lower the torque of the internal combustion engine at a quick torque response in accordance with switching of engagement of a friction engagement element. However, because there is a delay in response of the intake air amount after an operation of an intake system actuator, such as a throttle, it is difficult to promptly lower the torque only by a reduction in the intake air amount. Meanwhile, the torque can be lowered at a quick torque response by delaying the ignition timing. However, frequent delays in the ignition timing are not preferred because fuel economy of a vehicle is degraded. Furthermore, in a case of the internal combustion engine operated at a lean air-fuel ratio that is leaner than a theoretical air-fuel ratio, the delay in the ignition timing causes unstable combustion. Thus, a magnitude of lowering of the torque that can be achieved by the delay in the ignition timing is limited.

SUMMARY

The invention relates to an integrated vehicle control apparatus that cooperatively controls an internal combustion engine that is operated at a lean air-fuel ratio that is leaner than a theoretical air-fuel ratio, and a stepped automatic transmission. The invention provides an integrated vehicle control apparatus that can suppress generation of a gear shifting shock by lowering torque of the internal combustion engine at quick torque response when the stepped automatic transmission is upshifted.

In an embodiment of the invention, an integrated control apparatus for a vehicle is provided. The integrated control apparatus includes an internal combustion engine configured to be operated at a lean air-fuel ratio, and a stepped automatic transmission. The lean air-fuel ratio is leaner than a theoretical air-fuel ratio. The integrated control apparatus further includes a power train manager configured to control the internal combustion engine and the stepped automatic transmission, and an engine controller configured to control a torque of the internal combustion engine by adjusting an air amount and an air-fuel ratio. The power train manager of this embodiment is configured to output a target torque and a forenotice torque to the engine controller. The power train manager is also configured to output an upshifting instruction to the stepped automatic transmission, and to start lowering of the target torque when a specified time elapses after an output of the upshifting instruction. The power train manager is also configured to lower the forenotice torque prior to the lowering of the target torque. The forenotice torque is lowered in an approximate lowering aspect to the target torque. The engine controller of this embodiment is configured to start a reduction in the air amount in accordance with a magnitude of lowering of the forenotice torque, and to start reducing the air amount from a time when the lowering of the forenotice torque is started until a time when the lowering of the target torque is started. The engine controller is also configured to adjust the air-fuel ratio in accordance with a deviation between the target torque and an estimated torque that is estimated from the lean air-fuel ratio and the air amount.

In embodiments of the invention, the power train manager is configured to provide target torque and forenotice torque to the engine controller as an instruction to the engine controller. The target torque is a target value of torque that the engine controller causes the internal combustion engine to output. The forenotice torque is information on the target torque that is provided to the engine controller by the power train manager in the future. By the power train manager providing the forenotice torque to the engine controller prior to provision of the target torque, the engine controller can secure a preparation period that is required for the internal combustion engine to realize the target torque.

A power train manager according to embodiments of the invention is configured to lower the target torque in accordance with upshift timing of the stepped automatic transmission and lower the forenotice torque in an approximate aspect to the target torque prior to lowering of the target torque in the case where the stepped automatic transmission is upshifted. Here, the upshift timing of the stepped automatic transmission means a time at which an instruction is provided to switch engagement of a friction engagement element in the stepped automatic transmission. The lowering of the target torque is temporal, and a period thereof is preferably from the time the instruction is provided to switch engagement of the friction engagement element until completion of the switching. In addition, lowering of the forenotice torque in an approximate aspect as the target torque means that, in the case where a change in a value of the forenotice torque with respect to a temporal change and a change in a value of the target torque with respect to the temporal change are represented in time charts, a waveform of the forenotice torque and a waveform of the target torque that are shown therein are the same or approximately the same.

An engine controller according to embodiments of the invention is configured to start reducing the air amount in accordance with a magnitude of the lowering of the forenotice torque from a time when the lowering of the forenotice torque that is provided from the power train manager is started until a time when the lowering of the target torque that is also provided from the power train manager is started. The engine controller is also configured to adjust the air-fuel ratio in accordance with a deviation of torque, which is estimated from the air amount, from the target torque with the above-described lean air-fuel ratio as the set air-fuel ratio. In detail, when the estimated torque is smaller than the target torque, the air-fuel ratio is set to be richer than the set air-fuel ratio. When the estimated torque is larger than the target torque, the air-fuel ratio is set to be leaner than the set air-fuel ratio. It should be noted that a time period from a start of a reduction in the air amount until the lowering of the target torque is preferably set in accordance with a response time of the air amount.

According to the above configuration, the air amount, a response delay of which is significant, is reduced prior to the lowering of the target torque. Accordingly, it is possible to suppress the air amount from becoming excessive for the target torque when the target torque is lowered at upshift timing. On the other hand, the air amount becomes short for the target torque from the start of the reduction in the air amount to the lowering of the target torque. However, because the air-fuel ratio, the response delay of which is slight, is adjusted in accordance with the deviation of the torque, which is estimated from the air amount, from the target torque, shortage of actual torque for the target torque is suppressed. In this way, the actual torque is lowered in the same aspect as the target torque in accordance with the upshifting of the stepped automatic transmission.

According to embodiments of the invention, the forenotice torque that is provided from the power train manager to the engine controller during the upshifting of the stepped automatic transmission may be increased in the same aspect as the target torque prior to, or at the same time as, an increase in the target torque that is temporarily lowered. The engine controller that receives the forenotice torque may be configured to start increasing the air amount in accordance with a magnitude of an increase in the forenotice torque from a time when the increase in the forenotice torque is started until a time when the increase in the target torque is started, and adjust the air-fuel ratio in accordance with the deviation of the torque, which is estimated from the air amount, from the target torque, with the lean air-fuel ratio as the set air-fuel ratio. It should be noted that a time period from the increase in the forenotice torque until the increase in the target torque means, in detail, the timing of the increase in the forenotice torque until the timing of the increase in the target torque in the case where the power train manager increases the forenotice torque prior to the increase in the target torque, and means the timing of the increase in the forenotice torque and the target torque in the case where the power train manager increases the forenotice torque at the same time as the increase in the target torque. According to such a configuration, because the actual torque is increased in the same aspect as the target torque in accordance with completion of the upshifting of the stepped automatic transmission, the torque of the internal combustion engine can be increased at the quick torque response in accordance with the completion of the switching of the engagement of the friction engagement element.

It should be noted that, in the case where the increase in the air amount is started prior to the increase in the target torque, the air amount becomes temporarily excessive for the target torque. Thus, the air-fuel ratio is set to be leaner than the set air-fuel ratio by adjustment. In the case where the air-fuel ratio is set to be richer than the set air-fuel ratio, there is a concern of an increase in a NOx discharge amount that is caused when the air-fuel ratio approaches a region where a NOx generation rate is high. However, such a concern is unnecessary when the air-fuel ratio is set to be leaner than the set air-fuel ratio. However, when the air-fuel ratio becomes excessively lean, the air-fuel ratio may exceed a lean limit air-fuel ratio and may cause accidental fire. Accordingly, as an operation of the engine controller with respect to the increase in the forenotice torque, the air amount may be increased in accordance with the timing of the increase in the forenotice torque in the case where a difference between the current air-fuel ratio and the lean limit air-fuel ratio is at least equal to a specified threshold, and the increase in the air amount may be started in accordance with the timing of the increase in the target torque in the case where the difference between the current air-fuel ratio and the lean limit air-fuel ratio is smaller than the threshold. The aforementioned threshold is a margin that is set to prevent the air-fuel ratio from erroneously exceeding the lean limit air-fuel ratio.

According to another embodiment of the invention, an integrated control method for a vehicle is provided. The integrated control method includes an internal combustion engine configured to be operated at a lean air-fuel ratio that is leaner than a theoretical air-fuel ratio, a stepped automatic transmission, a power train manager, and an engine controller. The integrated control method includes: controlling a torque of the internal combustion engine by adjusting an air amount and an air-fuel ratio by the engine controller; controlling the internal combustion engine and the stepped automatic transmission by the power train manager; outputting a target torque (TQreq1) and a forenotice torque (TQreq2) to the engine controller by the power train manager; outputting an upshifting instruction to the stepped automatic transmission by the power train manager; starting lowering of the target torque (TQreq1) by the power train manager after a specified time elapses from a timing of an output of the upshifting instruction; lowering the forenotice torque (TQreq2) by the power train manager prior to the lowering of the target torque (TQreq1), the forenotice torque (TQreq2) being lowered in an approximate lowering aspect to the target torque (TQreq1); starting a reduction of the air amount by the engine controller in accordance with a magnitude of lowering of the forenotice torque (TQreq2), the reduction in the air amount being started from a time when the lowering of the forenotice torque (TQreq2) is started until a time when the lowering of the target torque (TQreq1) is started; and adjusting the air-fuel ratio by the engine controller in accordance with a deviation between the target torque (TQreq1) and a torque that is estimated from the lean air-fuel ratio and the air amount.

As it has been described so far, according to embodiments of an integrated vehicle control apparatus, the torque of an internal combustion engine can be lowered at a quick torque response during the upshifting of a stepped automatic transmission. In this way, the generation of the gear shifting shock can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made of embodiments of the invention with reference to the drawings. However, in the case where the number of unit, a numerical quantity, an amount, a range, or the like of each element is referred to in the embodiments, which will be described below, the invention is not limited to the referred numerical value except for a case where such a value is clearly expressed in particular or a case where the element is obviously specified to the number in principle. In addition, structures, steps, and the like described in the embodiments, which will be described below, are not necessarily essential to the invention except for a case where any of these is clearly expressed in particular or a case where any of these is obviously specified thereto in principle.

Figure 1:
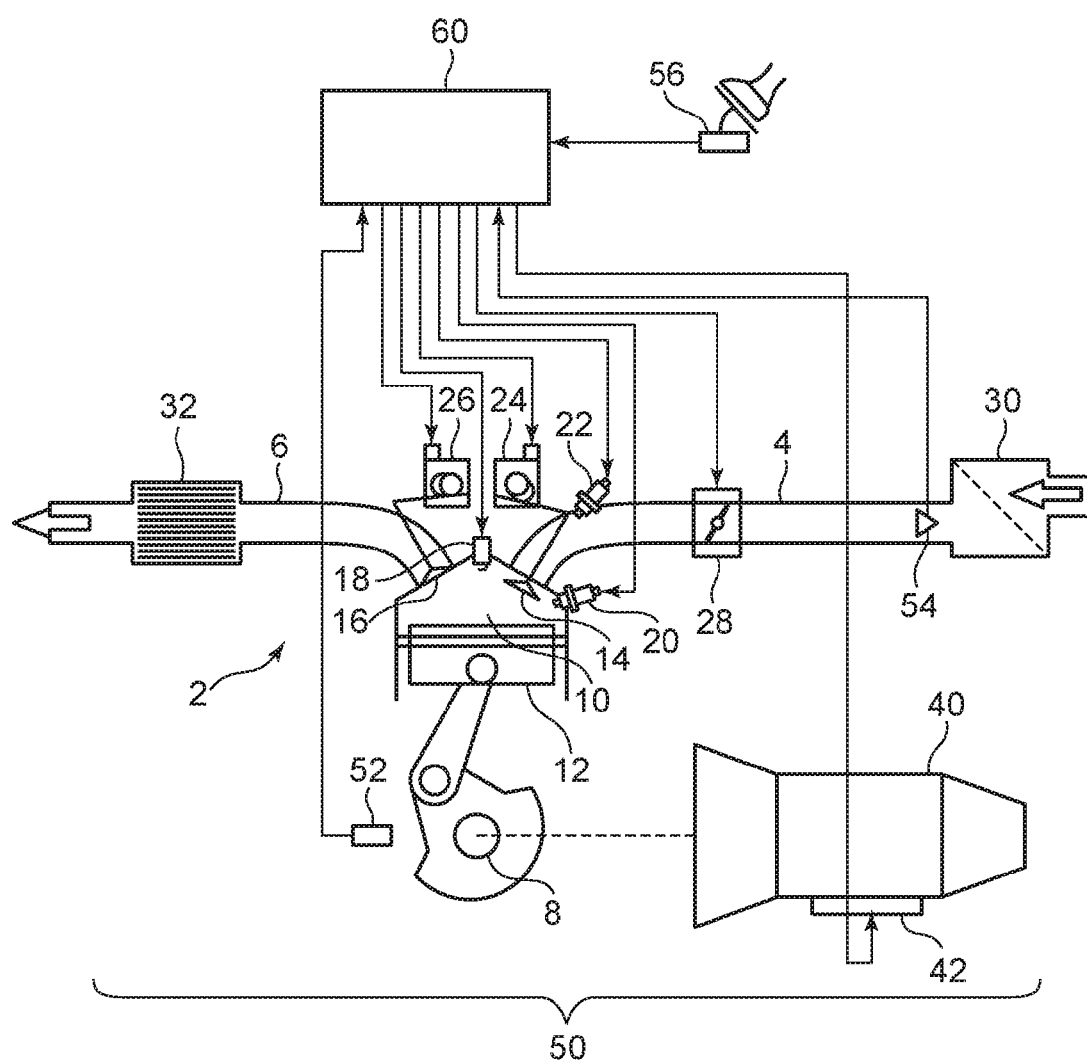
FIG. 1 is a view for explaining a configuration of a power system in a first embodiment of the invention.

FIG. 1 is a view of a configuration of a power system in a first embodiment. FIG. 1 is a power system for an automobile. This power system includes an internal combustion engine (hereinafter simply referred to as an engine) 2, a stepped automatic transmission (hereinafter simply referred to as a transmission) 40, a power train 50, and an integrated vehicle control apparatus 60. The engine 2 can be operated at a lean air-fuel ratio that is leaner than a theoretical air-fuel ratio. The transmission 40 is operated by electronic control. The power train 50 has the engine 2 and the stepped automatic transmission 40. The integrated vehicle control apparatus 60 controls the power train 50.

In this embodiment, the engine 2 is a spark ignition-type engine. An ignition plug 18 of an igniter is attached to a top of a combustion chamber 10 of each cylinder of the engine 2. The numbers of cylinders of the engine 2 and arrangement of the cylinders are not particularly limited. A piston 12 of each cylinder is coupled to a crankshaft 8 via a connecting rod. The crankshaft 8 is provided with a crank angle sensor 52 that is used for measurement of an engine speed.

An intake passage 4 and an exhaust passage 6 are connected to the combustion chamber 10 of this embodiment. The intake passage 4 is provided with an electronically controlled throttle 28. An air cleaner 30 is provided in an uppermost stream section of the intake passage 4. An airflow meter 54 for measuring a flow rate of air that is suctioned into the intake passage 4 is arranged on an immediately downstream side of the air cleaner 30. A catalyst 32 for purifying exhaust gas is provided in the exhaust passage 6.

A communication state between the combustion chamber 10 and the intake passage 4 is controlled by an intake valve 14. A communication state between the combustion chamber 10 and the exhaust passage 6 is controlled by an exhaust valve 16. The intake valve 14 is provided with a variable intake valve mechanism 24 that can change opening/closing timing thereof. The exhaust valve 16 is provided with a variable exhaust valve mechanism 26 that can change opening/closing timing thereof. As the mechanism that can change the opening/closing timing of the valve, a known mechanism that changes a phase of a camshaft with respect to a crankshaft can be used. The combustion chamber 10 is provided with an in-cylinder injection valve 20 that directly injects fuel. A port injection valve 22 that injects the fuel to an intake port is attached to the intake passage 4.

The transmission 40 is connected to the crankshaft 8 of the engine 2 of this embodiment. The transmission 40 incorporates plural gear units and a friction engagement element. The transmission 40 is configured to change a combination of the gear units by switching engagement of the friction engagement element by using a hydraulic control circuit 42. In addition, the transmission 40 is configured to selectively achieve any one of plural gear steps.

Various actuators and sensors provided in the engine 2 and the hydraulic control circuit 42 of the transmission 40 are electrically connected to the integrated vehicle control apparatus 60 of this embodiment. In addition, an accelerator pedal position sensor 56 that outputs a signal corresponding to an operation amount of an accelerator pedal by a driver is electrically connected to the integrated vehicle control apparatus 60. The integrated vehicle control apparatus 60 is a control apparatus for integrally controlling an entire drive system of a vehicle that includes: the power train 50 having the engine 2 and the transmission 40; and vehicle control systems, such as a vehicle stabilization control system and a traction control system. The integrated vehicle control apparatus 60 is constructed of an electronic control unit (ECU) that includes one or plural CPUs and memories (a ROM and a RAM) as a main body.

Figure 2:
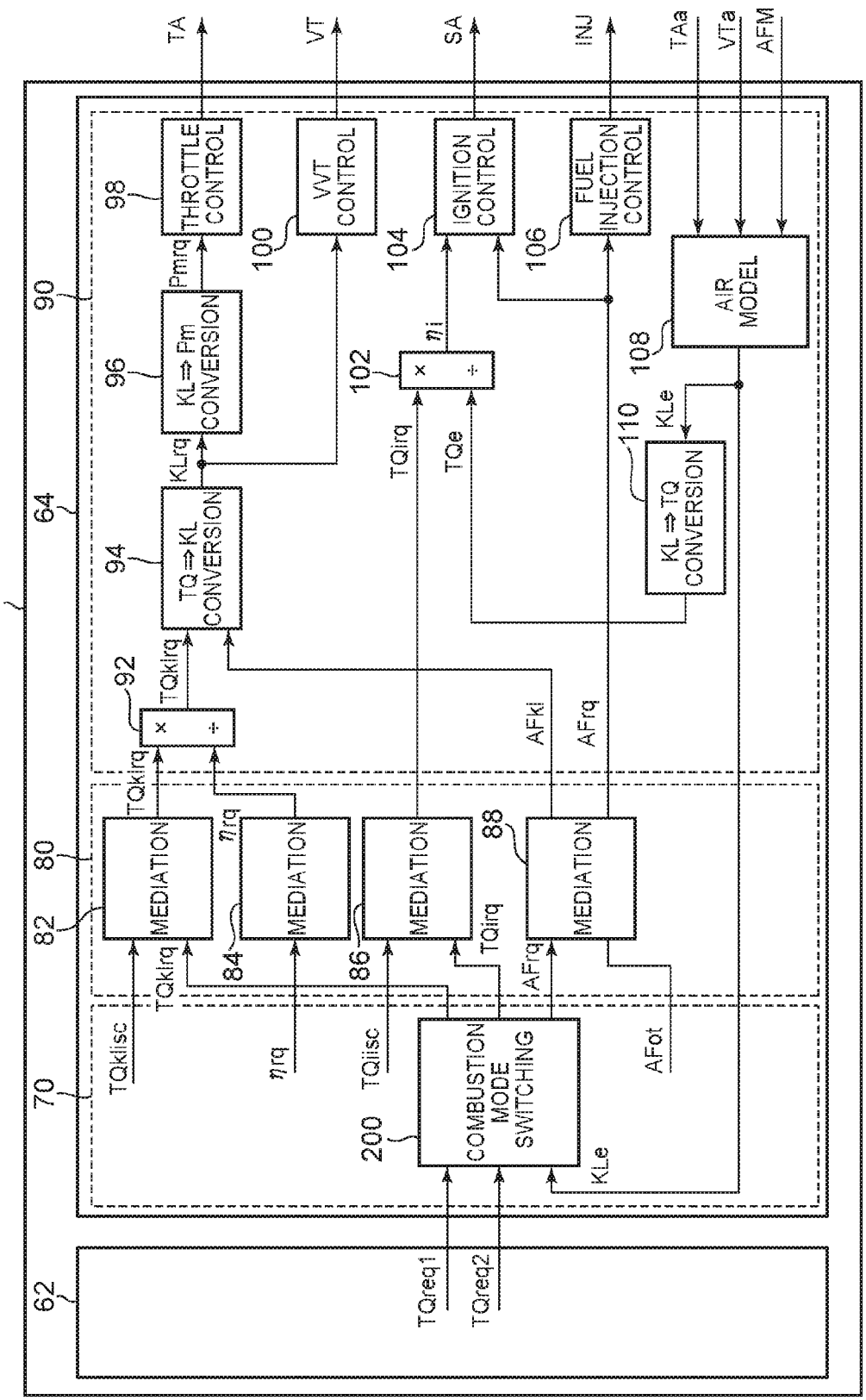
FIG. 2 is a block diagram of a configuration of an integrated vehicle control apparatus and flows of signals in the first embodiment of the invention.

FIG. 2 is a block diagram of a configuration of an integrated vehicle control apparatus 60 and flows of signals in an embodiment of the invention. The integrated vehicle control apparatus 60 includes a power train manager 62 and an engine controller 64. The power train manager 62 is a control apparatus that manages an operation of the power train 50. The power train manager 62 is configured to cooperatively control the engine 2 and the transmission 40 on the basis of sensor signals from the accelerator pedal position sensor 56 and the crank angle sensor 52, a request signal from the vehicle control system, and the like. The power train manager 62 instructs the engine 2 on various operation amounts, such as a throttle opening degree and a fuel injection amount, via the engine controller 64. The power train manager 62 instructs the transmission 40 on the gear step. The engine controller 64 is configured to control an operation of the engine 2 on the basis of a received signal from the power train manager 62. FIG. 2 shows the flows of the signals between the power train manager 62 and the engine controller 64 as well as details of a configuration of the engine controller 64 and the flows of the signals therein.

The power train manager 62 of this embodiment calculates target torque (represented as "TQreq1" in the drawing) and forenotice torque (represented as "TQreq2" in the drawing). The power train manager 62 is configured to provide each of the calculated target torque and the calculated forenotice torque to the engine controller 64. The target torque (TQreq1) is a target value of the torque that the engine controller 64 causes the engine 2 to output. The target torque includes: torque requested by a driver and calculated from a signal of the accelerator pedal position sensor 56; torque requested for gear shift control of the transmission 40; torque requested for traction control; torque requested for sideslip prevention control; and the like.

When the transmission 40 is upshifted, the power train manager 62 temporarily lowers the target torque in accordance with upshift timing. There is a response delay time (about 0.5 sec, for example) after the power train manager 62 instructs the hydraulic control circuit 42 of the transmission 40 on the gear step until the hydraulic control circuit 42 starts being operated. In addition, a specified switching time (about 0.5 sec, for example) is further required until switching of the friction engagement element is completed by the operation of the hydraulic control circuit 42. The power train manager 62 lowers the target torque once at a time point at which the response delay time has elapsed since the hydraulic control circuit 42 is instructed on the gear step. The power train manager 62 increases the target torque to an original magnitude at a time point at which the specified switching time has elapsed since the target torque is lowered once.

The forenotice torque (TQreq2) is information on the target torque that is provided to the engine controller 64 by the power train manager 62 in the future. The power train manager 62 first determines the target torque to be provided to the engine controller 64. The power train manager 62 provides the target torque to the engine controller 64 after a specified time elapses from a time when the target torque is determined. In a time period from determination of the target torque until provision thereof to the engine controller 64, the forenotice torque is generated from the target torque, and the generated forenotice torque is provided to the engine controller 64 prior to the target torque. A characteristic aspect of a change in the target torque, for example, an aspect of the change at a time that the target torque is lowered in accordance with upshifting of the transmission 40, or an aspect of the change at a time that the target torque is increased, is also passed onto the forenotice torque that is generated from the target torque.

When the transmission 40 is upshifted, the power train manager 62 lowers the forenotice torque at a time when the hydraulic control circuit 42 is instructed on the gear step. A time period from when the forenotice torque is lowered until the target torque is lowered is stored in the memory in advance. This time period is referred to as an advanced time of the forenotice torque with respect to the target torque. This advanced time is set in accordance with the response delay time after the power train manager 62 instructs the hydraulic control circuit 42 of the transmission 40 on the gear step until the hydraulic control circuit 42 starts being operated. After lowering the forenotice torque, the power train manager 62 also increases the forenotice torque to an original magnitude at a time when the target torque is increased.

Next, the configuration of the engine controller 64 of this embodiment will be described. The engine controller 64 is largely constructed of a function section 70, a mediation section 80, and a realization section 90.

The function section 70 calculates and outputs various control parameters for the engine 2. The control parameters include air target torque (represented as "TQklrq" in the drawing), ignition target torque (represented as "TQirq" in the drawing), a target air-fuel ratio (represented as "AFrq" in the drawing), requested efficiency (represented as "ηrq" in the drawing), air ISC torque (represented as "TQklisc" in the drawing), ignition ISC torque (represented as "TQiisc" in the drawing), and an OT prevention air-fuel ratio (represented as "AFot" in the drawing). Of these, the air target torque (TQklrq), the ignition target torque (TQirq), and the target air-fuel ratio (AFrq) are calculated in a combustion switching unit 200 that is placed in the function section 70.

The requested efficiency (ηrq) is a requested value of ignition timing efficiency and is the control parameter that is used for calculation of a target air amount. The ignition timing efficiency means a ratio of torque that is actually output to torque to be output in the case where ignition timing is optimum ignition timing. The ignition timing efficiency becomes 1 that is a maximum value when the ignition timing is the optimum ignition timing. It should be noted that the optimum ignition timing means minimum advance for best torque (MBT). In the case where trace knock ignition timing is set, the optimum ignition timing means the ignition timing on a delayed side of the MBT and the trace knock ignition timing. As the ignition timing efficiency is reduced, energy that is converted into the torque of energy that is generated by combustion of the fuel is reduced. Because of the energy that is not converted into the torque, a large amount of the energy is discharged together with the exhaust gas to the exhaust passage and is used to warm up the exhaust purification catalyst. During a time in which realization of such efficiency is not required, a value of the requested efficiency is retained to be 1 as a maximum value.

Of torque that is required to maintain a specified idling speed when the engine 2 is in an idle state, the air ISC torque (TQklisc) is torque that falls within a range of fluctuations that can be achieved only by control of an air amount. A valid value is output from the function section 70 only when the air ISC torque actually becomes necessary. During a time in which the air ISC torque is not necessary, an invalid value that is a larger value than maximum axial torque to be output by the engine 2 is output.

Of the torque that is required to maintain the specified idling speed when the engine 2 is in the idle state, the ignition ISC torque (TQiisc) is torque that requires control of the ignition timing for achievement thereof. A valid value is output from the function section 70 only when the ignition ISC torque actually becomes necessary. During a time in which the ignition ISC torque is not necessary, an invalid value that is a larger value than the maximum axial torque to be output by the engine is output.

The OT prevention air-fuel ratio (AFot) is a richer air-fuel ratio than the theoretical air-fuel ratio that is requested for prevention of overheating of the catalyst 32. In the case where a temperature of the catalyst 32 is likely to exceed an allowable temperature, the air-fuel ratio is increased to be richer than the theoretical air-fuel ratio. In this way, the inside of the cylinder is cooled by latent heat that is released during gasification of the fuel, and an exhaust temperature can thereby be lowered. A valid value is output from the function section 70 only when the air-fuel ratio actually has to become rich. During a time in which the air-fuel ratio does not have to become rich, an invalid value that is a larger value than a lean limit air-fuel ratio is output.

In this embodiment, the control parameters that are output from the function section 70 are input to the mediation section 80. In detail, the mediation section 80 includes an air target torque mediation unit 82, an efficiency mediation unit 84, an ignition target torque mediation unit 86, and a target air-fuel ratio mediation unit 88.

The air target torque mediation unit 82 mediates among the air target torque (TQklrq) and the air ISC torque (TQklisc) that are input from the function section 70 and another torque in the same category as those. The air target torque mediation unit 82 outputs mediated torque as the air target torque (TQklrq) for the engine 2. As a mediation method in the air target torque mediation unit 82, selection of a minimum value is used. Basically, the air target torque that is input from the function section 70 is output as is. However, when the air ISC torque is smaller than the air target torque, the air ISC torque is output as the air target torque.

The efficiency mediation unit 84 mediates between the requested efficiency that is input from the function section 70 and another efficiency in the same category as that. Then, the efficiency mediation unit 84 outputs mediated efficiency as the final requested efficiency (ηrq) for the engine 2. As a mediation method in the efficiency mediation unit 84, selection of a minimum value is used. Basically, the requested efficiency that is input from the function section 70 is output as is.

The ignition target torque mediation unit 86 mediates among the ignition target torque (TQirq) and the ignition ISC torque (TQiisc) that are input from the function section 70 and another torque in the same category as those. Then, the ignition target torque mediation unit 86 outputs mediated torque as the final ignition target torque (TQirq) for the engine 2. As a mediation method in the ignition target torque mediation unit 86, selection of a minimum value is used. Basically, the ignition target torque that is input from the function section 70 is output as is.

The target air-fuel ratio mediation unit 88 mediates among the target air-fuel ratio (AFrq) and the OT prevention air-fuel ratio (AFot) that are input from the function section 70 and another air-fuel ratio in the same category as those. The target air-fuel ratio mediation unit 88 outputs a mediated air-fuel ratio as the final target air-fuel ratio (AFrq) for the engine 2. As a mediation method in the target air-fuel ratio mediation unit 88, selection of a minimum value is used. In addition, when a combustion mode of the engine 2 is a lean mode, a specified lean air-fuel ratio that is leaner than the theoretical air-fuel ratio is output as an air target air-fuel ratio (AFkl) from the target air-fuel ratio mediation unit 88. When the combustion mode of the engine 2 is a stoichiometry mode, the theoretical air-fuel ratio is output as the air target air-fuel ratio (AFkl) from the target air-fuel ratio mediation unit 88. The air target air-fuel ratio is a parameter that provides conversion efficiency of the torque into the air amount and is used for the calculation of the target air amount.

In this embodiment, the mediated air target torque, the mediated requested efficiency, the mediated ignition target torque, the mediated target air-fuel ratio, and the mediated air target air-fuel ratio that are output from the mediation section 80 are input to the realization section 90. The realization section 90 corresponds to an inverse model of the engine 2 and is configured by including plural models represented by maps and functions. In the realization section 90, an operation amount of each actuator for a cooperative operation is computed. More specifically, the operation amounts of the actuators include the throttle opening degree (represented as "TA" in the drawing), valve opening/closing timing (represented as "VT" in the drawing), the ignition timing (represented as "SA" in the drawing), and the fuel injection amount (represented as "INJ" in the drawing).

In an embodiment of the invention, the realization section 90 is constructed of plural computation units 92, 94, 96, 98, 100, 102, 104, 106, 108, 110. Of these computation units, the computation units 92, 94, 96, 98, 100 are related to air amount control, the computation units 102, 104, 108, 110 are related to ignition timing control, and the computation unit 106 is related to fuel injection amount control. A description will hereinafter be made of a function of each computation unit in an order from the computation unit that is related to the air amount control.

The air target torque (TQklrq) and the requested efficiency (ηrq) are input to the computation unit 92. The computation unit 92 corrects the air target torque by dividing the air target torque by the requested efficiency. When the requested efficiency is 1, a value of the air target torque is maintained. When the requested efficiency is lower than 1, the value of the air target torque is inflated. A magnitude of an increase in the air target torque by inflation corresponds to a magnitude of lowering of torque by delaying of the ignition timing. The computation unit 92 outputs the corrected air target torque (TQklrq).

The corrected air target torque (TQklrq) and the air air-fuel ratio (AFkl) are input to the computation unit 94. The computation unit 94 calculates the target air amount (represented as "KLrq" in the drawing) from the air target torque. For the calculation of the target air amount, a torque-air amount conversion map in which the torque and an air amount for realizing the torque are associated is used. One of parameters for associating the torque with the air amount is the air target air-fuel ratio. In the computation unit 94, the air-fuel ratio is adjusted to the air target air-fuel ratio. Based on a premise that the ignition timing is set to the optimum ignition timing, the air amount that is required to realize the air target torque is computed as the target air amount. It should be noted that the air amount in embodiments of the invention is an amount of the air that is suctioned into the cylinder, and dimensionless charging efficiency thereof falls within an equivalent range to the air amount in embodiments of the invention.

The computation unit 96 calculates target intake pipe pressure (represented as "Pmrq" in the drawing) as a target value of intake pipe pressure from the target air amount (KLrq). For calculation of the target intake pipe pressure, an air amount-intake pipe pressure conversion map in which the air amount that is taken into a cylinder through the intake valve 14 and the intake pipe pressure are associated is used.

The computation unit 98 computes a throttle opening degree (TA) for realizing the target intake pipe pressure therefrom. For calculation of the throttle opening degree, an inverse model of an air model is used. The air model is a physical model in which a response characteristic of the intake pipe pressure with respect to an operation of the throttle 28 is modeled. By using the inverse model of the air model, the throttle opening degree for achieving the target intake pipe pressure can be obtained from the target intake pipe pressure. The throttle opening degree that is calculated in the computation unit 96 is converted into a signal for driving the throttle 28 and is sent to the throttle 28.

The computation unit 110 computes the valve opening/closing timing (VT) of the intake valve 14 on the basis of the target air amount. For calculation of the valve opening/closing timing, a map in which the air amount is associated with optimum valve opening/closing timing for achieving the air amount is used. The valve opening/closing timing that is calculated in the computation unit 100 is converted into a signal for driving the variable intake valve mechanism 24 and is sent to the variable intake valve mechanism 24.

Next, functions of the computation units that are related to the ignition timing control in this embodiment will be described. First, the computation unit 108 computes an estimated air amount (represented as "KLe" in the drawing) that is an estimated value of the air amount that is currently realized. For calculation of the estimated air amount, the air model is used. In the air model, an intake air flow rate (represented as "AFM" in the drawing) that is measured by an airflow meter is referred, and the estimated air amount is computed from the currently realized throttle opening degree (represented as "TAa" in the drawing) and the currently realized valve opening/closing timing (represented as "VTa" in the drawing). It should be noted that the estimated air amount that is computed in the computation unit 108 is also used in the combustion switching unit 200, which will be described below.

The computation unit 110 computes estimated torque (represented as "TQe" in the drawing) from the estimated air amount (KLe). For calculation of the estimated torque, an air amount-torque conversion map in which the air amount is associated with torque realized by the air amount is used. In the computation unit 110, the air-fuel ratio is adjusted to the target air-fuel ratio, and, based on the premise that the ignition timing is set to the optimum ignition timing, torque realized by the estimated air amount is computed as the estimated torque.

The ignition target torque (TQirq) and the estimated torque (TQe) are input to the computation unit 102. The computation unit 102 computes a ratio of the ignition target torque to the estimated torque as the ignition timing efficiency (represented as "ηi" in the drawing). Here, an upper limit is defined for the ignition timing efficiency. When the ratio of the ignition target torque to the estimated torque exceeds 1, a value of the ignition timing efficiency is restricted to be 1.

The computation unit 104 computes the ignition timing (SA) from the ignition timing efficiency (ηi). In detail, the computation unit 104 computes the optimum ignition timing on the basis of various engine state amounts and also computes a delay amount for the optimum ignition timing from the ignition timing efficiency. When the ignition timing efficiency is 1, the delay amount is set to zero. As the ignition timing efficiency becomes smaller than 1, the delay amount is increased. Then, ignition timing that is obtained by adding the delay amount to the optimum ignition timing is computed as the final ignition timing. For calculation of the optimum ignition timing, a map in which the optimum ignition timing is associated with the various engine state amounts can be used. For calculation of the delay amount, a map in which the delay amount is associated with the ignition timing efficiency and the various engine state amounts can be used. One of parameters used in those maps is the target air-fuel ratio (AFrq). The ignition timing that is calculated in the computation unit 104 is converted into a signal for driving the igniter and is sent to the igniter.

Next, a function of the computation unit that is related to the fuel injection amount control in this embodiment will be described. The computation unit 106 calculates a fuel injection amount (INJ) that is required to achieve the target air-fuel ratio, that is, a fuel supply amount for each cylinder on the basis of the target air-fuel ratio (AFrq) and the estimated air amount (KLe). The fuel injection amount for each cylinder that is calculated in the computation unit 106 is converted into a signal for driving the in-cylinder injection valve 20 or the port injection valve 22 and is sent to the in-cylinder injection valve 20 or the port injection valve 22 of each cylinder. It should be noted that a ratio between a fuel injection amount of the in-cylinder injection valve 20 and a fuel injection amount of the port injection valve 22 is determined in accordance with an operation range in which an operation point of the engine 2 is positioned by referring to a map that is prepared in advance.

Figure 3:
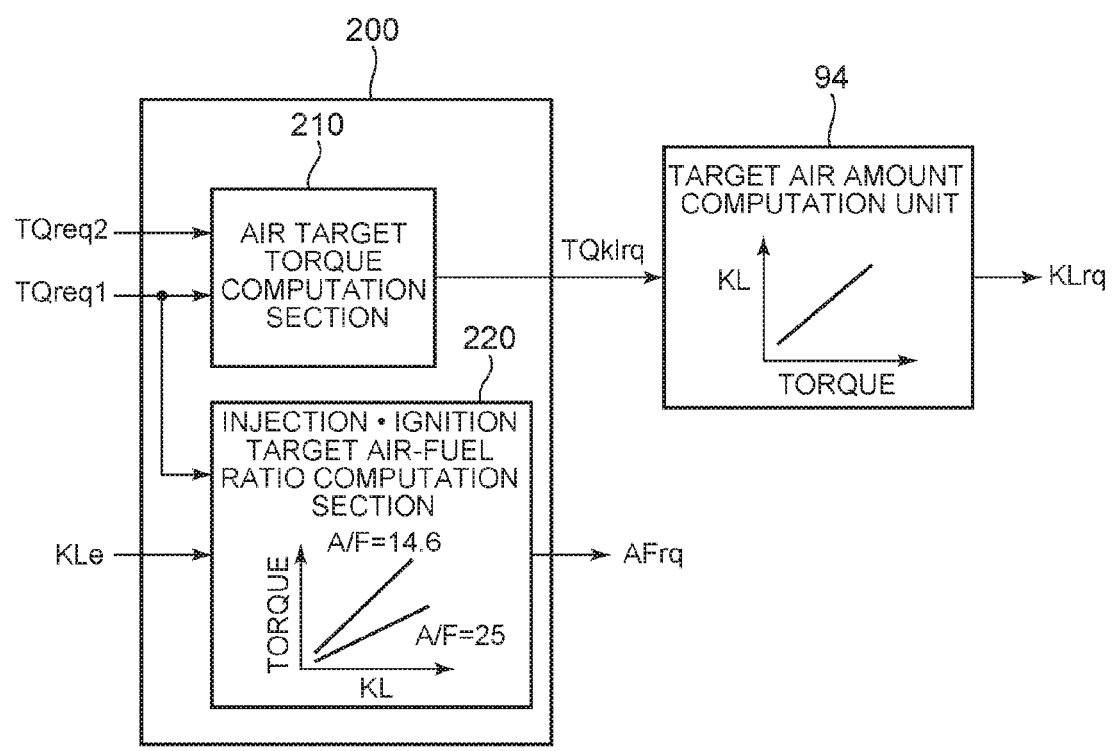
FIG. 3 is a block diagram of a configuration of a combustion switching unit and flows of the signals in the first embodiment of the invention.

FIG. 3 is a block diagram of a configuration of a combustion switching unit 200 and flows of the signals in an embodiment of the invention. In this embodiment, the target torque (TQreq1) and the forenotice torque (TQreq2) that are provided from a power train manager 62 to a function section 70 and the estimated air amount (KLe) that is computed in a realization section 90 are input to a combustion switching unit 200. The combustion switching unit 200 includes an air target torque computation section 210 and a target air-fuel ratio computation section 220.

The air target torque computation section 210 is configured to compute the air target torque (TQklrq) from the target torque and the forenotice torque. A computation flow of the air target torque by the air target torque computation section 210 will be described later in detail.

The target air-fuel ratio computation section 220 is configured to compute the target air-fuel ratio (AFrq) from the target torque and the estimated air amount. For calculation of the target air-fuel ratio, a map in which the torque is associated with the air amount with the air-fuel ratio as a parameter is used. In the target air-fuel ratio computation section 220, based on the premise that the ignition timing is set to the optimum ignition timing, the air-fuel ratio that is requested to realize the target torque by the estimated air amount is computed as the target air-fuel ratio.

According to logic of the target air-fuel ratio computation section 220, during an operation in the lean mode, the target air-fuel ratio is adjusted to a set air-fuel ratio (25, for example) in the lean mode in a steady state in which there are no changes in the target torque and the estimated air amount. However, in the case where the target torque is changed faster than a response speed of the air amount and torque that is obtained by the estimated air amount under the set air-fuel ratio becomes smaller than the target torque, the target air-fuel ratio is set to be richer than the set air-fuel ratio. On the other hand, in the case where the torque that is obtained by the estimated air amount under the set air-fuel ratio becomes larger than the target torque, the target air-fuel ratio is set to be leaner than the set air-fuel ratio.

It should be noted that, although not shown in FIG. 3, a combustion switching unit 200 of this embodiment also computes the ignition target torque (see FIG. 2). The ignition target torque is the target value of the torque that should be achieved by adjusting the ignition timing. The torque can be lowered at the quick torque response by delaying of the ignition timing. However, when the air-fuel ratio is leaner than the theoretical air-fuel ratio, delaying of the ignition timing unstabilizes the combustion. For this reason, torque control by the ignition target torque is executed when the combustion mode of an engine 2 is in the stoichiometry mode. In the lean mode in which delaying of the ignition timing is not used for the torque control, the combustion switching unit 200 sets the ignition target torque to the same value as the air target torque.

Figure 4:
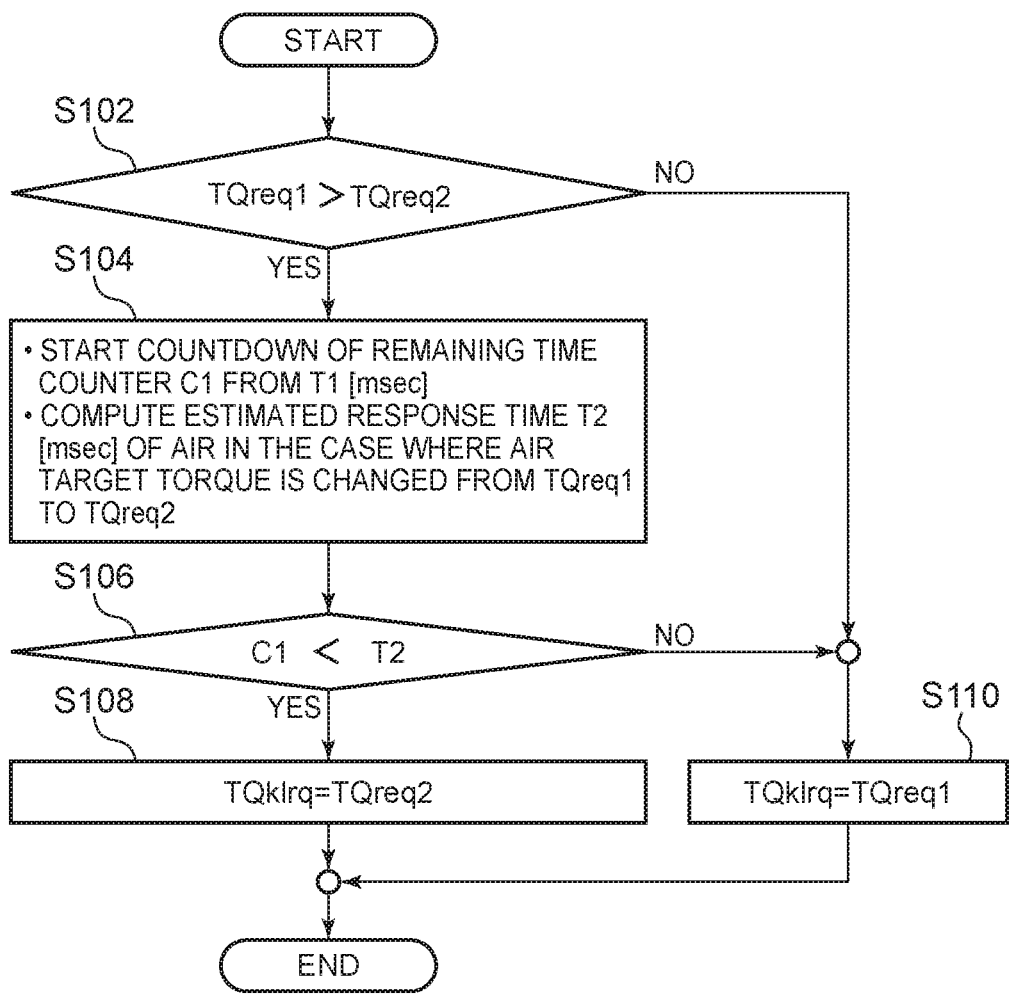
FIG. 4 is a flowchart for showing a computation flow of air target torque in the first embodiment of the invention.

FIG. 4 is a flowchart for showing the computation flow of an air target torque by an air target torque computation section 210. The air target torque computation section 210 repeatedly executes a routine represented as such a flow at specified control intervals that correspond to clock numbers of the ECU. Here, a detailed description will be made on the flow by raising a case where a transmission 40 is upshifted during the operation in the lean mode as an example.

In FIG. 4, it is determined in step S102 whether the forenotice torque (TQreq2) is smaller than the target torque (TQreq1). The forenotice torque matches the target torque until the transmission 40 is instructed to change the gear step by a power train manager 62. In this case, a determination result in step S102 becomes negative, and a process in step S110 is selected. In step S110, the target torque (TQreq1) is computed as the air target torque (TQklrq).

The power train manager 62 lowers the forenotice torque prior to the target torque. Timing of lowering is, for example, timing at which the transmission 40 is instructed to change the gear step. In this way, the determination result in step S102 is switched from negative to positive.

If the forenotice torque is smaller than the target torque, a process in step S104 is executed. During initial execution of the process in step S104, an advanced time T1 of the forenotice torque with respect to the target torque is read out from the memory. Then, with the advanced time T1 as an initial value, countdown of a remaining time counter C1 is started. In addition, during the initial execution of the process in step S104, an estimated response time T2 of the air amount in the case where the air target torque is changed from the target torque to the forenotice torque is computed. A map in which the estimated response time T2 is associated with the engine speed is stored in the memory. During the execution of the process in step S104 of the second time onward, only the countdown of the remaining time counter C1 is continuously executed.

Next, in step S106, the remaining time counter C1 and an estimated response time T2 are compared. If the remaining time counter C1 is at least equal to the estimated response time T2, a process in step S110 is selected. Then, until the remaining time counter C1 becomes shorter than the estimated response time T2, the target torque is used as the air target torque.

When the remaining time counter C1 becomes shorter than the estimated response time T2, a process in step S108 is selected instead of that in step S110. In step S108, the forenotice torque (TQreq2) is computed as the air target torque (TQklrq). The forenotice torque at this time is smaller than the target torque. Thus, when the process in step S108 is selected, the air amount starts being reduced prior to lowering of the target torque.

Later on, at a time point that the advanced time T1 elapses, the power train manager 62 lowers the target torque. In this way, the forenotice torque and the target torque match each other again, and the determination result in step S102 is switched from positive to negative again. Because the determination result in step S102 becomes negative, the process in step S110 is selected instead of that in step S108, and the target torque is again used as the air target torque.

Thereafter, the power train manager 62 increases the target torque to the original magnitude after a specified time (equal to a total time of the response delay time and switching time) has elapsed since the transmission 40 is instructed to change the gear step. In addition, the forenotice torque is also increased to the original magnitude at the same timing as the target torque. Because the air target torque at this time is the target torque, the air amount starts being increased in accordance with an increase in the target torque.

Figure 5:
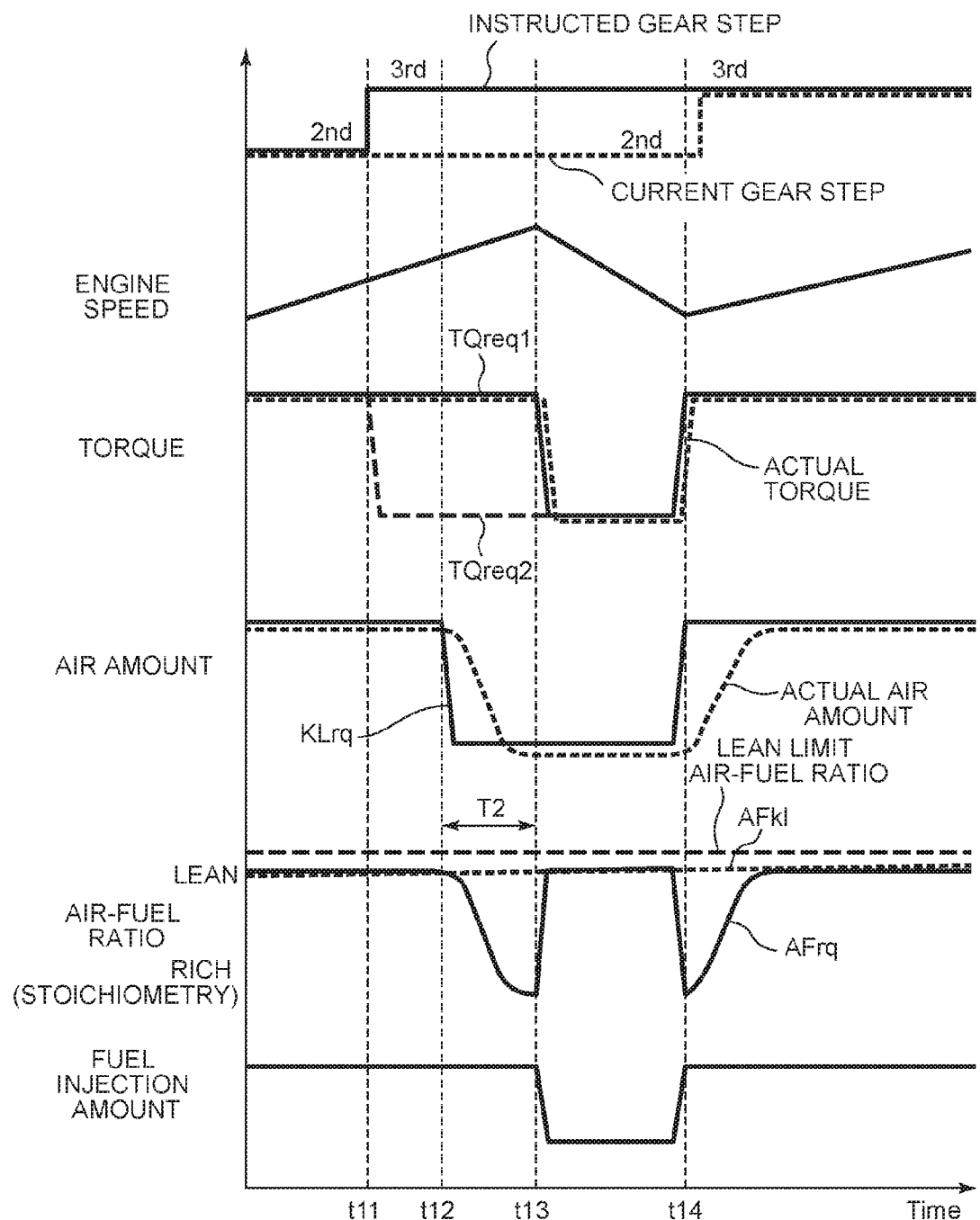
FIG. 5 is a time chart of an operation of an internal combustion engine during upshifting of a stepped automatic transmission in the first embodiment of the invention.

FIG. 5 is a time chart of the operation of an engine 2 during upshifting of a transmission 40 that is realized by an integrated vehicle control apparatus 60 of this embodiment.

FIG. 5 shows temporal changes of plural state amounts that determine the operation of the engine 2.

In a chart of a first stage, a gear step (an instructed gear step) on which the transmission 40 is instructed by a power train manager 62 is indicated by a solid line, and the gear step (the current gear step) that is realized in the transmission 40 is indicated by a dotted line. In this example, upshifting from a second gear step (2nd) to a third gear step (3rd) is made.

A chart of a second stage shows an engine speed. In this example, the gear step of the transmission 40 is shifted to an upper gear step due to an increase in the engine speed by acceleration.

In a chart of a third stage, the target torque (TQreq1) is indicated by a solid line, the forenotice torque (TQreq2) is indicated by a broken line, and actual torque is indicated by a dotted line. The actual torque shown here is a calculation value that is computed from the air amount, the fuel injection amount, and the ignition timing. It should be noted that the ignition timing is maintained to an optimum ignition timing.

In a chart of a fourth stage, the target air amount (KLrq) is indicated by a solid line, and an actual air amount is indicated by a dotted line. The actual air amount shown here can be considered to be equal to an estimated air amount that is calculated in an engine controller 64 by using the air model.

In a chart of a fifth stage, the target air-fuel ratio (AFrq) is indicated by a solid line, the air target air-fuel ratio (AFkl) is indicated by a dotted line, and the lean limit air-fuel ratio is indicated by a broken line. The air target air-fuel ratio is a set air-fuel ratio in the lean mode.

A chart of a sixth stage shows a fuel injection amount. The fuel injection amount is determined from the target air-fuel ratio and the air amount (the actual air amount). When the ignition timing is maintained to an optimum ignition timing, the torque is substantially determined by the fuel injection amount. Thus, a waveform of the actual torque and a waveform of the fuel injection amount are substantially similar to each other.

In FIG. 5, at time t11, the transmission 40 is instructed to change the gear step by the power train manager 62, and the forenotice torque that is provided to the engine controller 64 from the power train manager 62 is started lowering. Then, at later time t12, the target air amount that is calculated by the engine controller 64 is reduced, and the actual air amount starts being reduced. Time t11 to time t12 is a time period in which an estimated response time T2 is subtracted from the above-described advanced time T1. During this time, the target air-fuel ratio is maintained to the set air-fuel ratio in the lean mode.

At time t13 at which the estimated response time T2 elapses since the time t12, the target torque that is provided to the engine controller 64 from the power train manager 62 is lowered. In order to achieve the target torque under the set air-fuel ratio, a waveform of the target torque and a waveform of the actual air amount need to be similar or approximate to each other. However, because the actual air amount starts being reduced from the time t12, a deviation occurs between the waveform of the target torque and the waveform of the actual air amount, and the actual air amount becomes short for the target torque from the time t12 to the time t13. In order to compensate for lowering of the torque due to shortage of the actual air amount, the target air-fuel ratio is set to be richer than the set air-fuel ratio, that is, approximates the theoretical air-fuel ratio so as to be able to realize the target torque under the actual air amount from the time t12 to the time t13.

A start of the reduction in the actual air amount is advanced from the time t13 by the estimated response time T2. Accordingly, when the target torque is lowered at the time t13, the actual air amount is converged to an amount suitable for the target torque that has been lowered. Thus, the shortage of the actual air amount for the target torque is solved at the time t13. In this way, the target air-fuel ratio is returned to the set air-fuel ratio.

By the above operation, the waveform of the target torque that is lowered at a quick torque response is realized by the actual torque at the time t13. In this way, an engine speed can promptly be lowered in accordance with a start of the switching of the friction engagement element in the transmission 40. Thus, generation of a gear shift shock that is associated with upshifting can be suppressed.

Later on, at time t14 at which a specified time (switching time of the friction engagement element) elapses from the time t13, both of the target torque and the forenotice torque that are provided from the power train manager 62 to the engine controller 64 are increased. Because the target air amount that is calculated by the engine controller 64 is also increased at this timing, the actual air amount is increased in a delayed manner from the target torque. Thus, for a while from the time t14, the deviation occurs between the waveform of the target torque and the waveform of the actual air amount, and the actual air amount becomes short for the target torque. In order to compensate for lowering of the torque due to the shortage of the actual air amount, for a while from the time t14, the target air-fuel ratio is set to be richer than the set air-fuel ratio, that is, approximates the theoretical air-fuel ratio so as to be able to realize the target torque under the actual air amount.

By the above operation, the waveform of the target torque that is increased at the quick torque response is realized by the actual torque at the time t14. In this way, acceleration can promptly be resumed after upshifting of the transmission 40 is completed.

A power system of a second embodiment has the same configuration as that shown in FIG. 1 of the first embodiment.

An integrated vehicle control apparatus 60 of the second embodiment has the same configuration as that shown in FIG. 2 of the first embodiment. However, in the case where a transmission 40 is upshifted, a power train manager 62 of the second embodiment increases the forenotice torque to the original magnitude prior to the timing at which the target torque is increased after lowering the forenotice torque and the target torque.

A combustion switching unit 200 of the second embodiment has the same configuration as that shown in FIG. 3 of the first embodiment.

Figure 6:
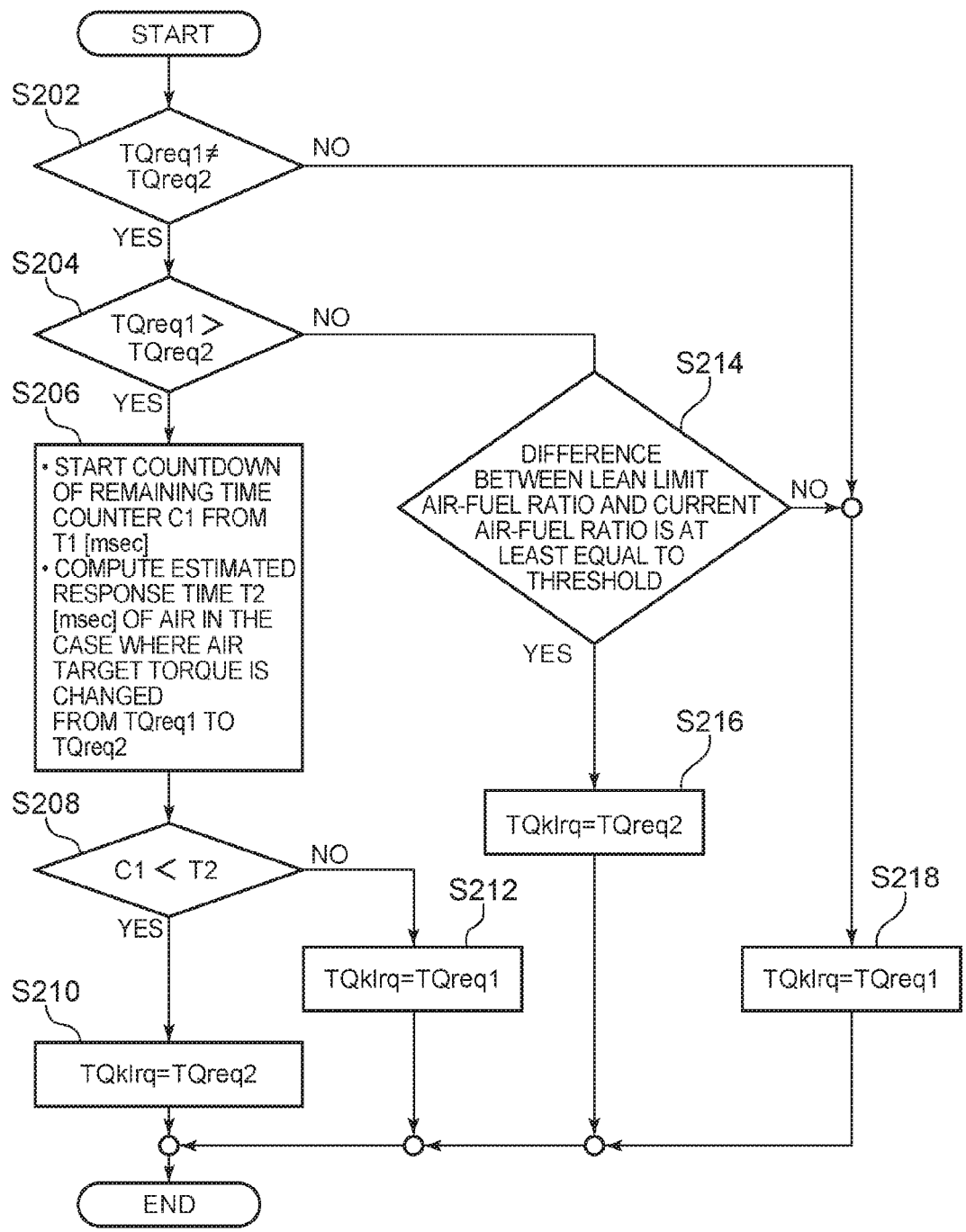
FIG. 6 is a flowchart of a computation flow of the air target torque in a second embodiment of the invention.

FIG. 6 is a flowchart of a computation flow of the air target torque by an air target torque computation section 210 in the second embodiment. Hereinafter, a detailed description will be made on the flow by raising the case where a transmission 40 is upshifted during the operation in the lean mode as the example.

In FIG. 6, it is determined in step S202 whether the target torque (TQreq1) and the forenotice torque (TQreq2) are unmatched. The forenotice torque matches the target torque until the transmission 40 is instructed to change the gear step by the power train manager 62. In this case, a determination result in step S202 becomes negative, and a process in step S218 is selected. In step S218, the target torque (TQreq1) is computed as the air target torque (TQklrq).

In this embodiment, the power train manager 62 lowers the forenotice torque prior to the target torque. This timing is, for example, timing at which the transmission 40 is instructed to change the gear step. In this way, the determination result in step S202 is switched from negative to positive.

If the target torque and the forenotice torque are unmatched, a determination in step S204 is made next. It is determined in step S204 whether the forenotice torque is smaller than the target torque. Because the forenotice torque is lowered prior to the target torque, a determination result in step S204 becomes positive.

If the determination result in step S204 is positive, a process in step S206 is executed. Contents of the process in step S206 are the same as the contents of the process in step S104 in the computation flow of the air target torque shown in FIG. 4.

In step S208, a remaining time counter C1 and an estimated response time T2 are compared. If the remaining time counter C1 is at least equal to the estimated response time T2, a process in step S212 is selected. Then, the target torque is used as the air target torque until the remaining time counter C1 becomes shorter than the estimated response time T2.

Once the remaining time counter C1 becomes shorter than the estimated response time T2, a process in step S210 is selected instead of that in step S212. In step S210, the forenotice torque is computed as the air target torque. In this way, the air amount starts being reduced prior to the lowering of the target torque.

Later on, at a time point that an advance time T1 elapses, the power train manager 62 lowers the target torque. In this way, the forenotice torque and the target torque match each other again, and the determination result in step S202 is switched from positive to negative again. Because the determination result in step S202 becomes negative, the process in step S218 is selected instead of that in step S210, and the target torque is used as the air target torque again.

Thereafter, the power train manager 62 increases the forenotice torque to the original magnitude prior to the target torque at the timing at which a specified time has elapsed since the transmission 40 is instructed to change the gear step. In this way, the determination result in step S202 is switched from negative to positive.

The determination result in step S204 becomes negative because the forenotice torque is increased prior to the target torque.

If the determination result in step S204 is negative, a process in step S214 is executed next. It is determined in step S214 whether a difference between the lean limit air-fuel ratio and the current air-fuel ratio is at least equal to a threshold. The lean limit air-fuel ratio is determined from the state amounts of the engine 2, such as the engine speed, by referring to maps stored in the memory. The current air-fuel ratio herein is equal to the set air-fuel ratio in the lean mode. In addition, the threshold is a margin that is set to prevent the air-fuel ratio from erroneously exceeding the lean limit air-fuel ratio.

If a determination result in step S214 is positive, a process in step S216 is selected. In step S216, the forenotice torque is computed as the air target torque. In this way, the increase in the air amount is started in accordance with timing of the increase in the forenotice torque.

If the determination result in step S214 is negative, a process in step S218 is selected. In this way, the target torque is computed as the air target torque. Thus, the increase in the air amount is started in accordance with timing of the increase in the target torque.

Figure 7:
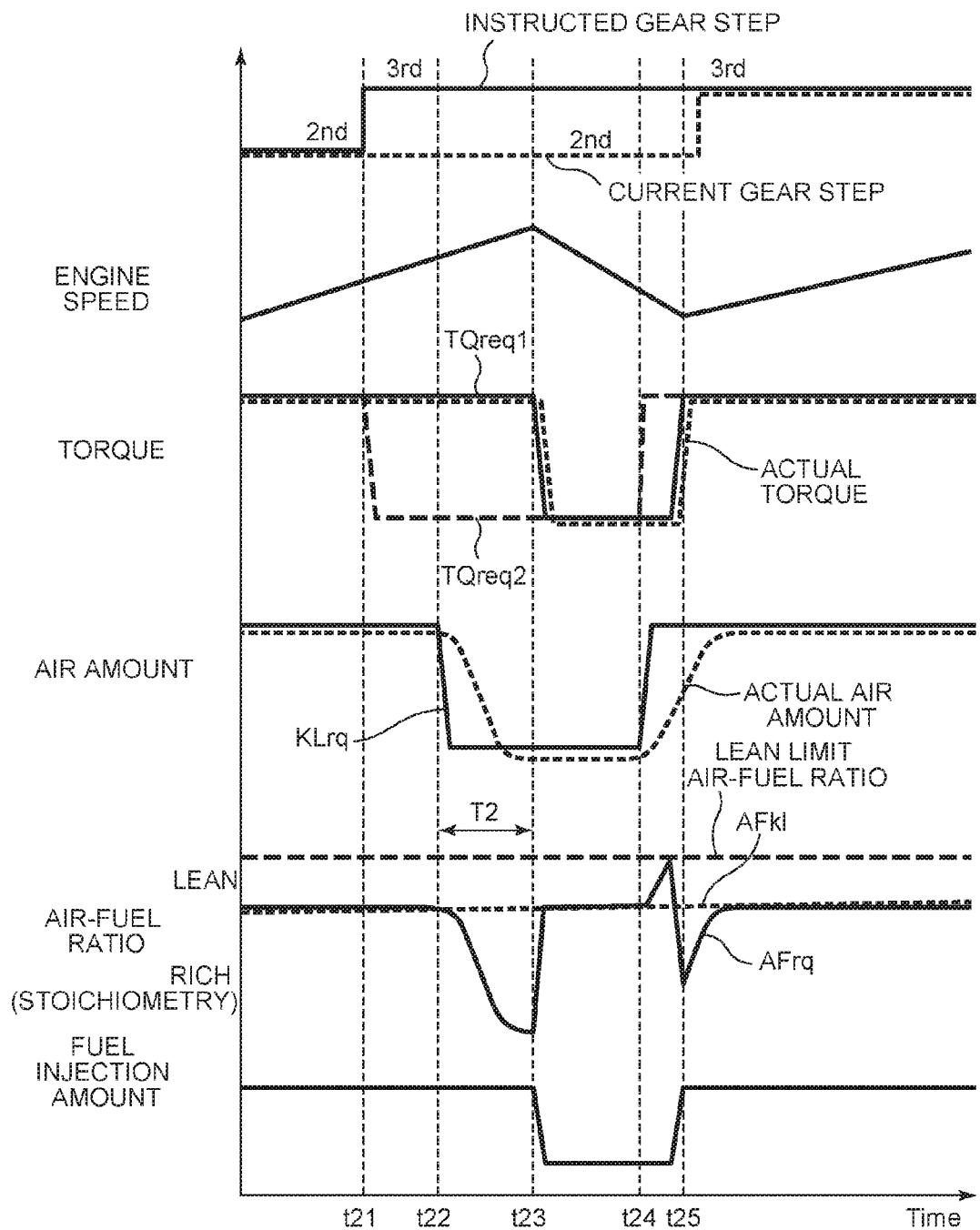
FIG. 7 is a time chart of the operation of an internal combustion engine during upshifting of a stepped automatic transmission in the second embodiment of the invention.

FIG. 7 is a time chart of the operation of an engine 2 during upshifting of the transmission 40 that is realized by an integrated vehicle control apparatus 60 of the second embodiment. FIG. 7 shows temporal changes of the plural state amounts that determine the operation of the engine 2. Items of the chart from a first stage to a sixth stage are the same as the items shown in the time chart in FIG. 5 with respect to the first embodiment.

The operation of the engine 2 from time t21 to time t23 in FIG. 7 is the same as the operation of an engine 2 from the time t11 to the time t13 in the time chart in FIG. 5.

According to FIG. 7, at time t24 at which a specified time (a shorter time than the switching time of the friction engagement element) elapses from the time t23, the forenotice torque that is provided to an engine controller 64 from a power train manager 62 is increased. In the case where a difference between the air-fuel ratio (the set air-fuel ratio in the lean mode) at this time and the lean limit air-fuel ratio is at least equal to the threshold, as shown in FIG. 7, the target air amount that is computed by the engine controller 64 is also increased at this timing. In this way, the actual air amount is increased prior to the target torque.

Later on, at time t25 at which a specified time further elapses from the time t24, the target torque that is provided to the engine controller 64 from the power train manager 62 is increased. Accordingly, the actual air amount becomes excessive for the target torque from the time t24 to the time t25. However, for a while from the time t25, the actual air amount becomes short for the target torque. In order to suppress an increase in the torque that is caused by the excessive actual air amount, the target air-fuel ratio is set to be leaner than the set air-fuel ratio in a range where the target air-fuel ratio does not exceed the lean limit air-fuel ratio from the time t24 to the time t25. Then, for a while from the time t25, in order to compensate for lowering of the torque due to the shortage of the actual air amount, the target air-fuel ratio is set to be richer than the set air-fuel ratio.

By the above operation, a time period in which the target air-fuel ratio is richer than the set air-fuel ratio in the lean mode and a degree of richness thereof can be reduced. A NOx discharge amount is increased as the air-fuel ratio approaches the theoretical air-fuel ratio. However, according to the above operation, the NOx discharge amount can be suppressed.

A power system of a third embodiment has the same configuration as that shown in FIG. 1 of the first embodiment.

An integrated vehicle control apparatus 60 of the third embodiment has the same configuration as that shown in FIG. 2 of the first embodiment. However, a power train manager 62 of the third embodiment can change a lowering speed of the target torque that is provided to an engine controller 64 during upshifting of a transmission 40. For example, in the case where an operation mode that can be selected by a driver is a sport mode, the target torque is rapidly lowered. In a case of a comfort mode, the lowering speed of the target torque is suppressed.

A combustion switching unit 200 of the third embodiment has the same configuration as that shown in FIG. 3 of the first embodiment.

Figure 8:
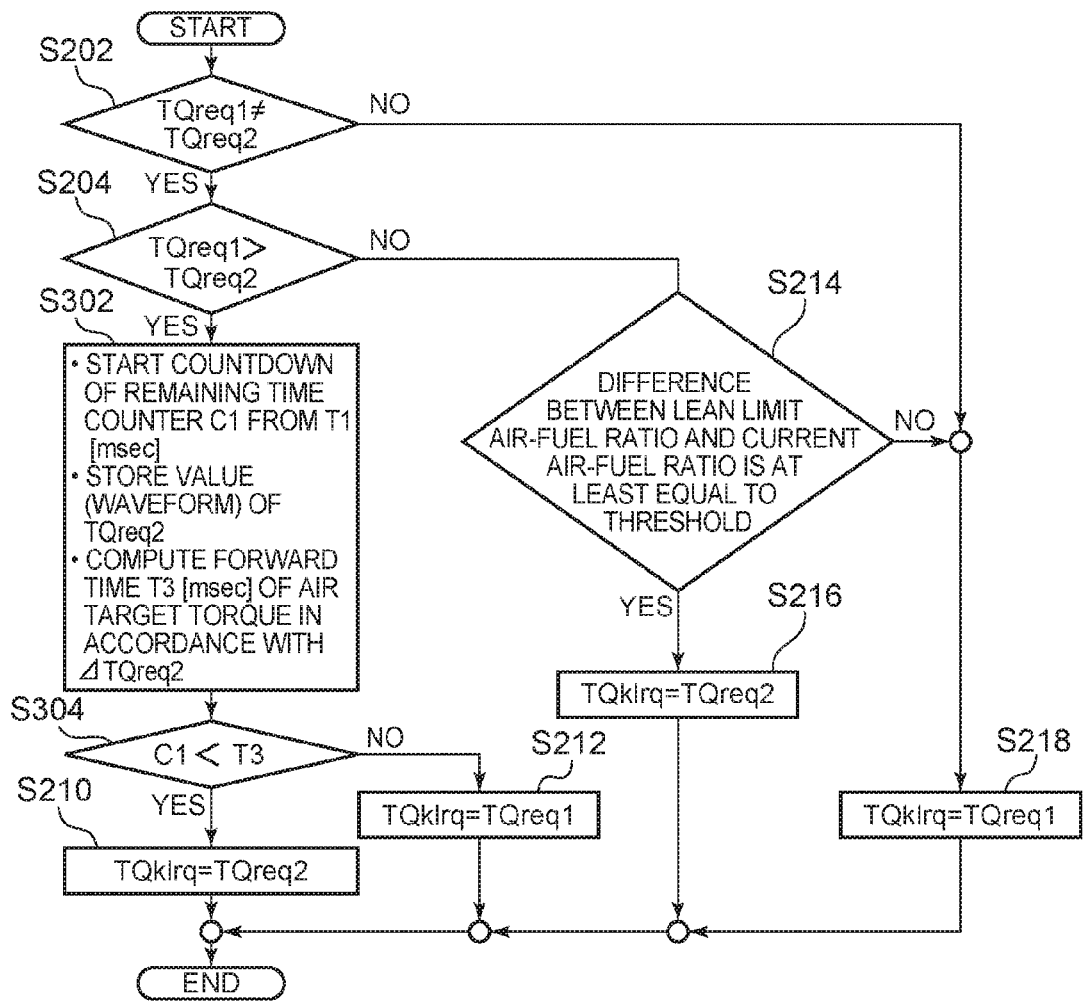
FIG. 8 is a flowchart of a computation flow of the air target torque in a third embodiment of the invention.

FIG. 8 is a flowchart of a computation flow of the air target torque by an air target torque computation section 210 of the third embodiment. In FIG. 8, processes that have the same contents as those in the flowchart shown in FIG. 6 are denoted by the same step numbers. Hereinafter, a detailed description will be made on the flow by raising the case where the transmission 40 is upshifted during the operation in the lean mode as the example.

According to the flow shown in FIG. 8, if the determination result in step S204 is positive, a process in step S302 is executed instead of the process in step S206. When the determination result in step S204 becomes positive, the power train manager 62 lowers the forenotice torque prior to the target torque. This timing is, for example, the timing at which the transmission 40 is instructed to change the gear step.

During first execution of the process in step S302, an advanced time T1 of the forenotice torque with respect to the target torque is read out from the memory. Then, countdown of a remaining time counter C1 is started with the advanced time T1 as an initial value. In addition, during the first execution of the process in step S302, a value (a waveform) of the forenotice torque in a specified period is stored, and a lowering speed (a magnitude of lowering per control interval, for example) of the forenotice torque ($\Delta$TQreq2) is calculated. Then, a time (forward time) T3 in which the lowering of the air target torque is advanced from the lowering of the target torque is computed from a lowering speed of the forenotice torque. A map in which the forward time T3 is associated with the lowering speed of the forenotice torque is stored in the memory. In the map, it is set such that, as the lowering speed of the forenotice torque is increased, the forward time T3 is extended. During execution of the process in step S302 of the second time onward, only the countdown of the remaining time counter C1 is continuously executed.

Next, in step S304, the remaining time counter C1 and a forward time T3 are compared. If the remaining time counter C1 is at least equal to the forward time T3, the process in step S212 is selected. Then the target torque (TQreq1) is used as the air target torque (TQklrq) until the remaining time counter C1 becomes shorter than the forward time T3.

When the remaining time counter C1 becomes shorter than the forward time T3, the process in step S210 is selected instead of that in step S212. In step S210, the forenotice torque (TQreq2) is computed as the air target torque (TQklrq). In this way, the air amount starts being reduced prior to the lowering of the target torque.

As set forth in the description of the first embodiment, a target air-fuel ratio computation section 220 computes the target air-fuel ratio (AFrq) by using a map (see FIG. 3) in which the torque is associated with the air amount with the air-fuel ratio as the parameter. This also applies to the third embodiment. However, the target air-fuel ratio computation section 220 of the third embodiment computes the target air-fuel ratio (an injection—ignition target air-fuel ratio) in accordance with a flowchart in FIG. 9 in the operation in the lean mode when the transmission 40 is upshifted and the target torque (TQreq1) is increased again after being temporarily lowered.

Figure 9:
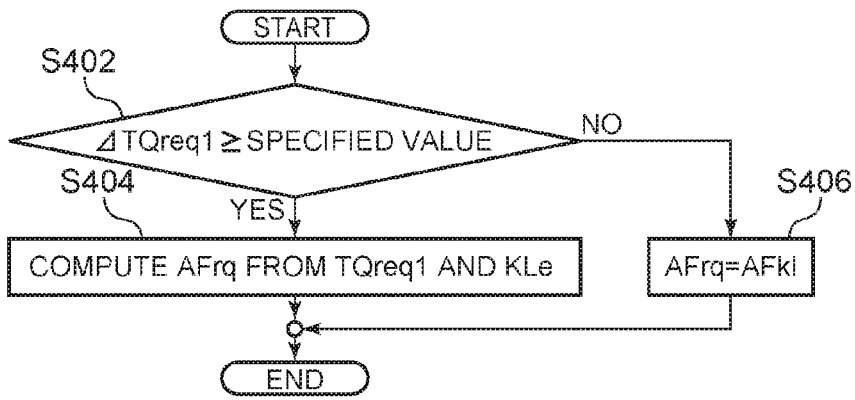
FIG. 9 is a flowchart of a computation flow of a target air-fuel ratio in the third embodiment of the invention.

According to a flow shown in FIG. 9, it is determined in step S402 whether an increase speed of the target torque ($\Delta$TQreq1) is at least equal to a specified value. The increase speed of the target torque is, for example, a magnitude of an increase per control interval. If the increase speed of the target torque is at least equal to the specified value, a process in step S404 is selected. Then, as described in the first embodiment, the target air-fuel ratio (AFrq) is computed from the target torque (TQreq1) and the estimated air amount (KLe).

However, if the increase speed of the target torque is lower than the specified value, a process in step S406 is selected. In this case, the target air-fuel ratio (AFrq) is set to be equal to the air target air-fuel ratio (AFkl). That is, the torque is not adjusted by the air-fuel ratio, and the air-fuel ratio is maintained to the specified lean air-fuel ratio.

Figure 10:
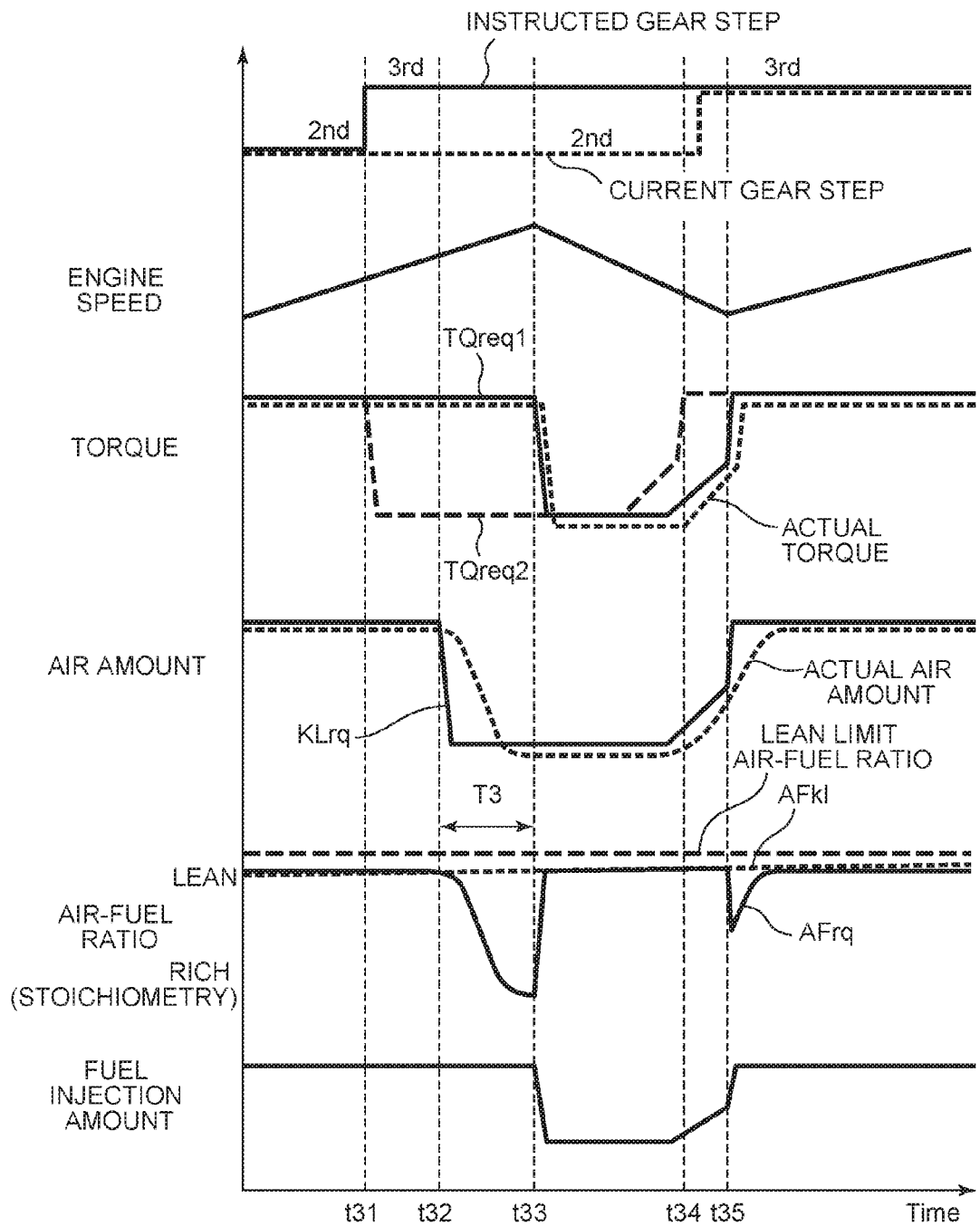
FIG. 10 is a time chart of the operation of an internal combustion engine during upshifting of a stepped automatic transmission in the third embodiment of the invention.
Figure 11:
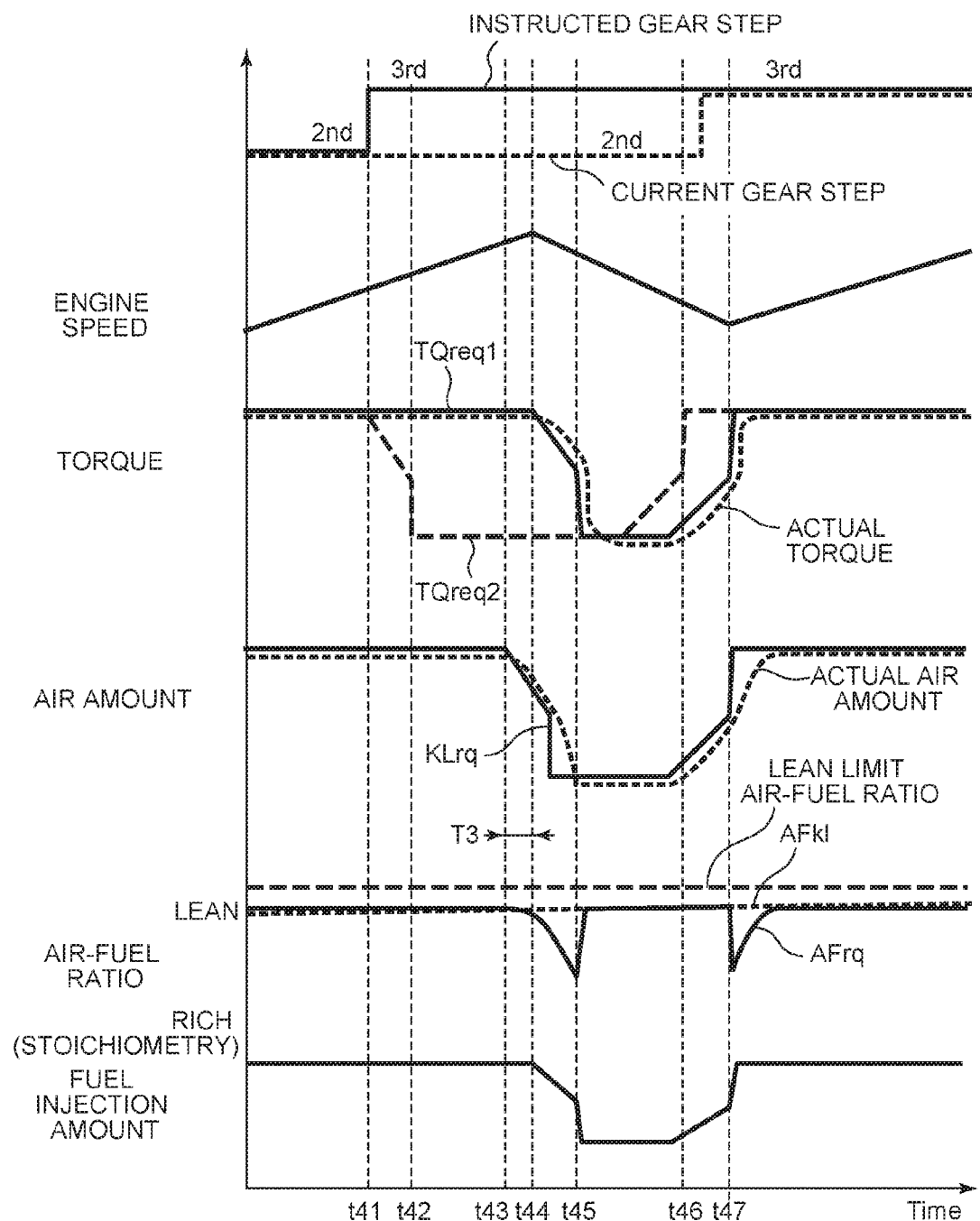
FIG. 11 is a time chart of the operation of an internal combustion engine during upshifting of a stepped automatic transmission in the third embodiment of the invention.

FIG. 10 and FIG. 11 are time charts of the operation of an engine 2 during upshifting of a transmission 40 that is realized by an integrated vehicle control apparatus 60 of the third embodiment. FIG. 10 and FIG. 11 show temporal changes of the plural state amounts that determine the operation of the engine 2. Items of each of the charts from a first stage to a sixth stage are the same as the items shown in the time chart in FIG. 5.

The time chart in FIG. 10 shows the operation of the engine 2 in the case where the target torque, the lowering speed of which is high, is provided during the upshifting.

According to FIG. 10, at time t31, the transmission 40 is instructed to change the gear step by a power train manager 62, and the forenotice torque that is provided to an engine controller 64 from the power train manager 62 is lowered. A forward time T3 is determined in accordance with the lowering speed of the forenotice torque at this time.

Then, at time t32 later, the target air amount that is calculated by the engine controller 64 is reduced, and the actual air amount starts being reduced by following this. Time t31 to time t32 is a time period that is obtained by subtracting the forward time T3 from an advanced time T1. Then, at time t33 at which the forward time T3 elapses from the time t32, the target torque that is provided to the engine controller 64 from the power train manager 62 is lowered.

In FIG. 10, at time t34 at which a specified time (the switching time of the friction engagement element) elapses from the time t33, the target torque that is provided to the engine controller 64 from the power train manager 62 is increased. In FIG. 10, the target torque has such a waveform that it is gradually increased at first and is rapidly increased from the middle. From the time t34, at which the target torque starts being increased, to time t35, an increase speed of the target torque is set to a speed that can be realized by increasing the air amount.

The forenotice torque that is provided to the engine controller 64 from the power train manager 62 is increased prior to the time t34, at which the target torque is increased. However, the difference between the air-fuel ratio (the set air-fuel ratio in the lean mode) and the lean limit air-fuel ratio at that time is smaller than the threshold. Accordingly, by following the determination in step S214 in the flow shown in FIG. 8, the target air amount that is calculated by the engine controller 64 does not start being increased at a time when the forenotice torque is increased but starts being increased at a time when the target torque is increased.

Because the increase speed of the target torque is suppressed from the time t34 to the time t35, the target air-fuel ratio is maintained to the set air-fuel ratio by following the determination in step S402 in the flow shown in FIG. 9. In this case, because the actual air amount is increased without being delayed from the target torque, the increased target torque is substantially realized by the change in the air amount only.

Because the target torque is rapidly increased at the time t35, the change in the actual air amount is slower than that in the target torque for a while from the time t35. Accordingly, in order to compensate for the lowering of the torque due to the shortage of the actual air amount, the target air-fuel ratio is set to be richer than the set air-fuel ratio for a while from the time t35. However, because a deviation between the waveform of the target torque and the waveform of the actual air amount at this time is slight, the period in which the target air-fuel ratio is richer than the set air-fuel ratio and the degree of richness thereof can be reduced.

The time chart in FIG. 11 shows the operation of the engine 2 in the case where the target torque that has a slower lowering speed than a reference speed during the upshifting is provided.

According to FIG. 11, at time t41, the transmission 40 is instructed to change the gear step by the power train manager 62, and the forenotice torque that is provided to the engine controller 64 from the power train manager 62 is lowered. In FIG. 11, the forenotice torque is gradually lowered at first and is rapidly lowered in the middle at time t42. A lowering speed of the forenotice torque at a start of the lowering is set to a gradual speed that can be realized by reducing the air amount. Thus, a forward time T3 that is determined in accordance with the lowering speed of the forenotice torque becomes a shorter time than that in the example shown in the time chart in FIG. 10.

Then, at time t43 later, the target air amount that is calculated by the engine controller 64 is reduced, and the actual air amount starts being reduced. Time t41 to time t43 is a time period that is obtained by subtracting the forward time T3 from an advanced time T1. Then, at time t44 at which the forward time T3 elapses from the time t43, the target torque that is provided to the engine controller 64 from the power train manager 62 starts being lowered. As indicated for the forenotice torque, the target torque is gradually lowered at the speed that can be realized by reducing the air amount from the time t44 to time t45, and is rapidly lowered at the time t45.

In FIG. 11, the actual air amount is reduced prior to the target torque from the time t43 to the time t45. Accordingly, the actual air amount becomes short for the target torque, and in order to compensate for the lowering of the torque due to the shortage of the actual air amount, the target air-fuel ratio is set to be richer than the set air-fuel ratio from the time t43 to the time t45. However, because an amount of the shortage of the actual air amount for the target torque at this time is slight, the period in which the target air-fuel ratio is richer than the set air-fuel ratio and the degree of richness thereof can be suppressed.

The lowering speed of the target torque is set to a speed that can be realized by reducing the air amount. Accordingly, when the target torque is rapidly lowered at the time t45, the actual air amount is converged to an amount that is suitable for the target torque after the lowering. In this way, the shortage of the actual air amount for the target torque is resolved at the time t45. In this way, the target air-fuel ratio is returned to the set air-fuel ratio.

The operation of the engine 2 at the time t45 onward in FIG. 11 is the same as the operation of the engine 2 at the time t33 onward in the time chart in FIG. 10.

An engine 2 shown in FIG. 1 is an engine of natural intake type. However, an integrated vehicle control apparatus according to the invention can also be applied to a supercharged engine that includes a turbocharger. In a case of the supercharged engine, supercharging pressure may be adjusted by actuators, such as a waste gate valve and a variable nozzle, and, in this way, an air amount may be adjusted.

What is claimed is:

1. An integrated control apparatus for a vehicle including:
an internal combustion engine configured to be operated at an air-fuel ratio that is leaner than a theoretical air-fuel ratio, and
a stepped automatic transmission,
the integrated control apparatus comprising:
a power train manager configured to control the internal combustion engine and the stepped automatic transmission; and
an engine controller configured to control a torque of the internal combustion engine by adjusting an air amount and the air-fuel ratio,
the power train manager being configured to output a target torque and a forenotice torque to the engine controller,
the power train manager being configured to output an upshifting instruction to the stepped automatic transmission,
the power train manager being configured to start lowering of the target torque after a specified time elapses from a timing of an output of the upshifting instruction,
the power train manager being configured to lower the forenotice torque prior to the lowering of the target torque, the forenotice torque being lowered in an approximate lowering aspect to the target torque,
the engine controller being configured to start a reduction in the air amount ratio based on a magnitude of lowering of the forenotice torque, the engine controller being configured to start reducing the air amount from a time when the lowering of the forenotice torque is started until a time when the lowering of the target torque is started, and
the engine controller being configured to adjust the air-fuel ratio based on a deviation between the target torque and an estimated torque that is estimated from the lean air-fuel ratio and the air amount.

2. The integrated control apparatus according to claim 1, wherein
when the stepped automatic transmission is upshifted, the power train manager is configured to increase the forenotice torque at the same time as, or prior to, an increase in the target torque that has been temporarily lowered by the power train manager, the forenotice torque being increased in an approximate increasing aspect to the target torque,
the engine controller is configured to start increasing the air amount in accordance with a magnitude of an increase in the forenotice torque, the engine controller being configured to start increasing the air amount from a time when the increase in the forenotice torque is started until a time when the increase in the target torque is started, and
the engine controller is configured to adjust the air-fuel ratio based on the deviation between the target torque and the torque that is estimated from the lean air-fuel ratio and the air amount.

3. The integrated control apparatus according to claim 2, wherein
the engine controller is configured to start increasing the air amount in accordance with a timing of the increase in the forenotice torque when a difference between a current air-fuel ratio and a lean limit air-fuel ratio is equal to or larger than a specified threshold, and the engine controller is configured to start increasing the air amount in accordance with a timing of the increase in the target torque when the difference is smaller than the threshold.

4. An integrated control method for a vehicle including
an internal combustion engine configured to be operated at an air-fuel ratio that is leaner than a theoretical air-fuel ratio,
a stepped automatic transmission,
a power train manager, and
an engine controller,
the integrated control method comprising:
controlling a torque of the internal combustion engine by adjusting an intake air amount and an air-fuel ratio by the engine controller;
controlling the internal combustion engine and the stepped automatic transmission by the power train manager;
outputting a target torque and a forenotice torque to the engine controller by the power train manager;
outputting an upshifting instruction to the stepped automatic transmission by the power train manager;
starting lowering of the target torque by the power train manager after a specified time elapses from a timing of an output of the upshifting instruction;
lowering the forenotice torque by the power train manager prior to the lowering of the target torque, the forenotice torque being lowered in an approximate lowering aspect to the target torque;
starting a reduction of the air amount by the engine controller in accordance with a magnitude of lowering of the forenotice torque, the reduction in the air amount being started from a time when the lowering of the forenotice torque is started until a time when the lowering of the target torque is started; and
adjusting the air-fuel ratio by the engine controller in accordance with a deviation between the target torque and an estimated torque that is estimated from the lean air-fuel ratio and the air amount.

5. The integrated control method according to claim 4, wherein
the power train manager is configured to increase the forenotice torque at the same time as, or prior to, an increase in the target torque that is temporarily lowered, the forenotice torque being increased in an approximate increasing aspect to the target torque,
the engine controller is configured to start increasing the air amount based on a magnitude of an increase in the forenotice torque, the engine controller being configured to start increasing the air amount from a time when the increase in the forenotice torque is started until a time when the increase in the target torque is started, and
the engine controller is configured to adjust the air-fuel ratio amount based on the deviation between the target torque and the torque that is estimated from the lean air-fuel ratio and the air amount.

6. The integrated control method according to claim 5, wherein
the engine controller is configured to start increasing the air amount based on a timing of the increase in the forenotice torque when a difference between a current air-fuel ratio and a lean limit air-fuel ratio is at least equal to a specified threshold, and the engine controller is configured to start increasing the air amount based on a timing of the increase in the target torque when the difference is smaller than the threshold.

* * * * *